United States Patent
Leonard et al.

(10) Patent No.: US 10,941,730 B2
(45) Date of Patent: Mar. 9, 2021

(54) SYSTEM AND METHOD FOR INJECTING AN AQUEOUS SOLUTION ON-BOARD A VEHICLE

(71) Applicant: Plastic Omnium Advanced Innovation and Research, Brussels (BE)

(72) Inventors: Stephane Leonard, Brussels (BE); Laurent Duez, Uccle (BE); Beatriz Monge-Bonini, Brussels (BE); Joel Op De Beeck, Lint (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 16/333,868

(22) PCT Filed: Sep. 18, 2017

(86) PCT No.: PCT/EP2017/073496
§ 371 (c)(1),
(2) Date: Mar. 15, 2019

(87) PCT Pub. No.: WO2018/050893
PCT Pub. Date: Mar. 22, 2018

(65) Prior Publication Data
US 2019/0203664 A1    Jul. 4, 2019

(30) Foreign Application Priority Data

Sep. 16, 2016  (EP) .................................... 16189285
Dec. 2, 2016  (EP) .................................... 16306609
Dec. 14, 2016  (EP) .................................... 16204045

(51) Int. Cl.
*F02M 25/022*    (2006.01)
*F02M 25/028*    (2006.01)
(Continued)

(52) U.S. Cl.
CPC ........ *F02M 25/022* (2013.01); *F02M 25/028* (2013.01); *F02M 25/0221* (2013.01);
(Continued)

(58) Field of Classification Search
None
See application file for complete search history.

(56) References Cited

U.S. PATENT DOCUMENTS 4,274,970 A *  6/1981  Beitzel .................... C02F 1/325
                                                  204/158.2
9,784,158 B2 * 10/2017  Maguin ................. F01N 3/2066
(Continued)

FOREIGN PATENT DOCUMENTS

DE     10 2008 015 599 A1    10/2009
DE        102008015599 A1 *  10/2009 ........... F01N 3/2066
(Continued)

OTHER PUBLICATIONS

International Search Report dated Nov. 13, 2017 in PCT/EP2017/073496 filed on Sep. 18, 2017.
(Continued)

*Primary Examiner* — Kevin A Lathers
(74) *Attorney, Agent, or Firm* — Oblon, McClelland, Maier & Neustadt, L.L.P.

(57) ABSTRACT

The invention relates to a vehicle system for injecting an aqueous solution, said vehicle system comprising: a tank (500) for storing an aqueous solution; an injection system (300) configured for injecting aqueous solution from the tank (500) in an injection zone (Z) in the vehicle; and a UV light decontamination device (700) configured for decontaminating the aqueous solution stored in the tank (500) by emitting UV light.

27 Claims, 14 Drawing Sheets

(51) Int. Cl.
*F02M 25/03* (2006.01)
*F02M 37/02* (2006.01)

(52) U.S. Cl.
CPC .... *F02M 25/0222* (2013.01); *F02M 25/0224* (2013.01); *F02M 25/0227* (2013.01); *F02M 25/03* (2013.01); *F02M 37/025* (2013.01); *Y02T 10/12* (2013.01)

(56) References Cited

U.S. PATENT DOCUMENTS

| | | |
|---|---|---|
| 2011/0174717 A1 | 7/2011 | Braunheim et al. |
| 2012/0047880 A1 | 3/2012 | Leonard et al. |
| 2012/0080368 A1 | 4/2012 | Eberle et al. |
| 2012/0311999 A1 | 12/2012 | Hodgson et al. |
| 2018/0128212 A1* | 5/2018 | Burak ................ F02M 25/0222 |

FOREIGN PATENT DOCUMENTS

| | | |
|---|---|---|
| DE | 10 2008 034 903 A1 | 1/2010 |
| DE | 10 2009 019 800 A1 | 11/2010 |
| DE | 10 2014 222 471 A1 | 5/2016 |
| EP | 2 419 611 A0 | 2/2012 |
| EP | 3 018 331 A1 | 5/2016 |
| WO | WO 2010/119116 A2 | 10/2010 |
| WO | WO 2011/085830 A1 | 7/2011 |
| WO | WO 2014/056790 A1 | 4/2014 |
| WO | WO 2016/085385 A1 | 6/2016 |
| WO | WO 2016/177556 A1 | 11/2016 |

OTHER PUBLICATIONS

European Office Action dated Feb. 10, 2020 in Patent Application No. 17 771 410.2, 5 pages.

* cited by examiner

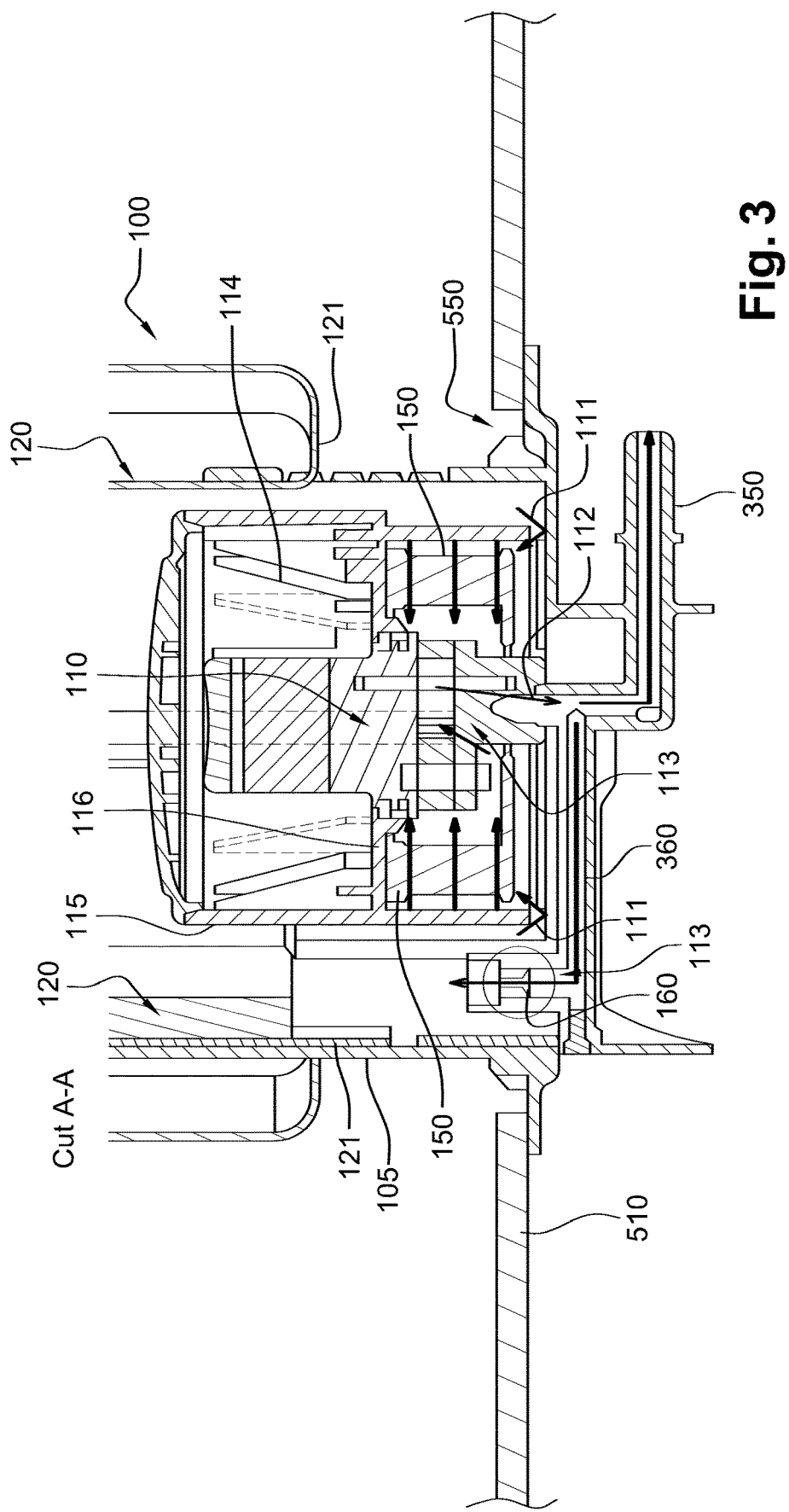

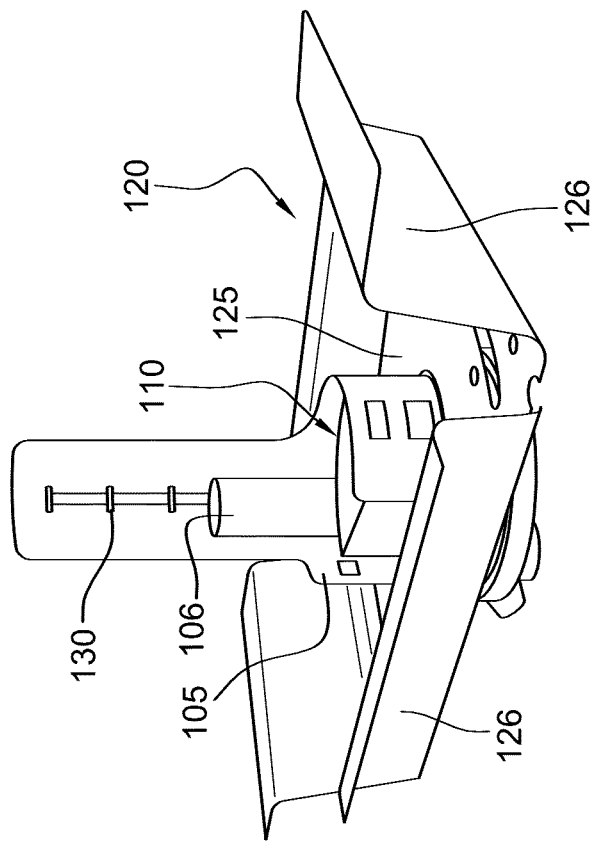
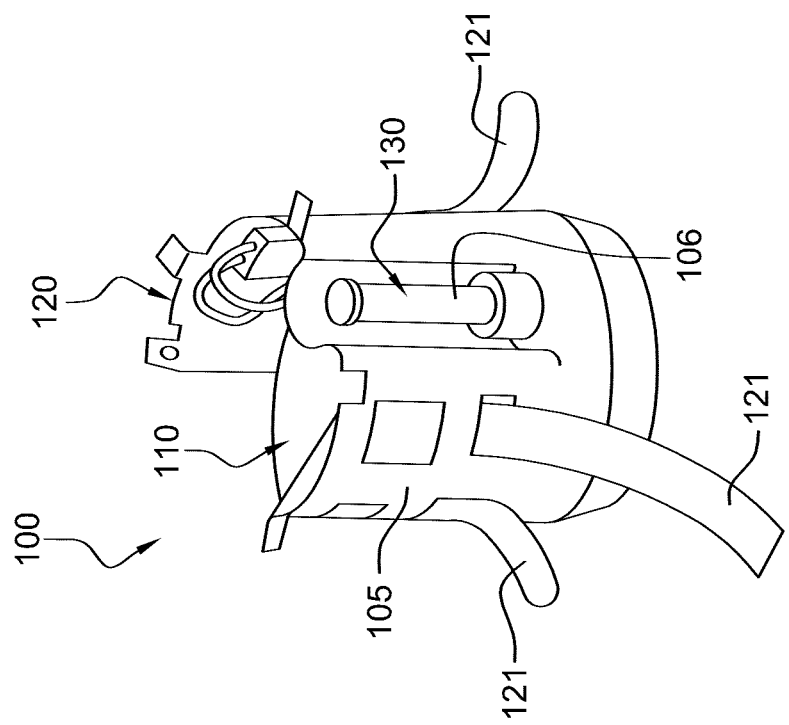

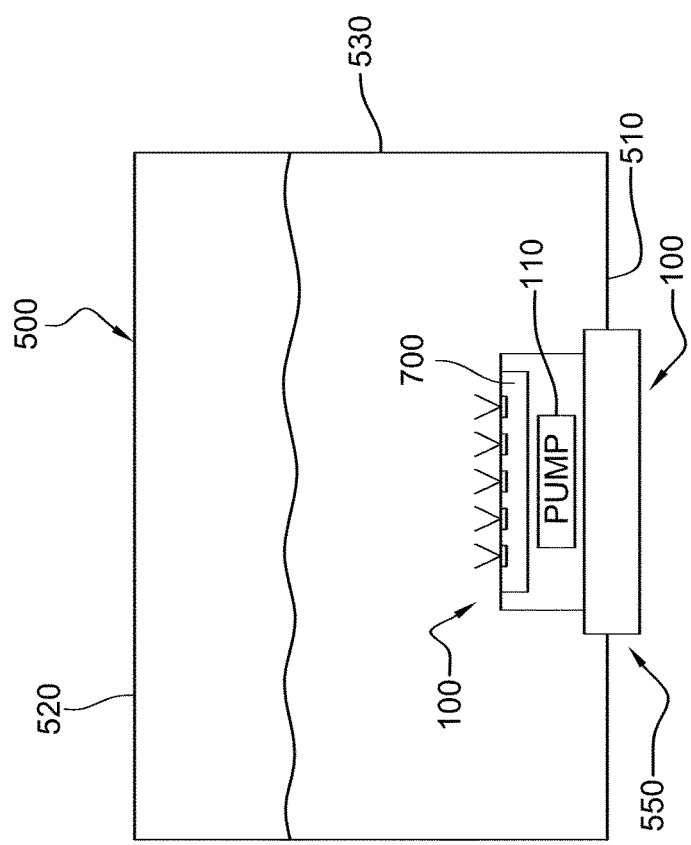
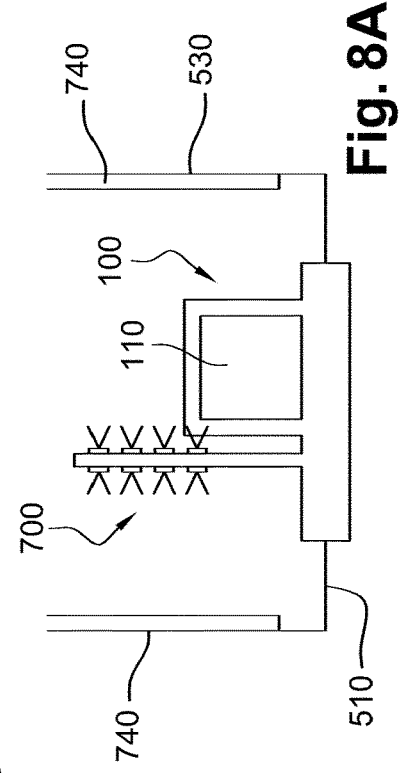
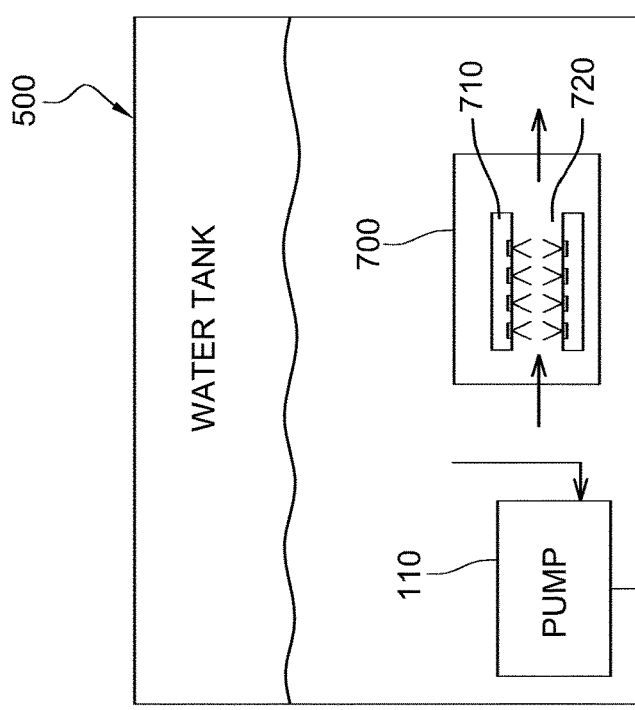
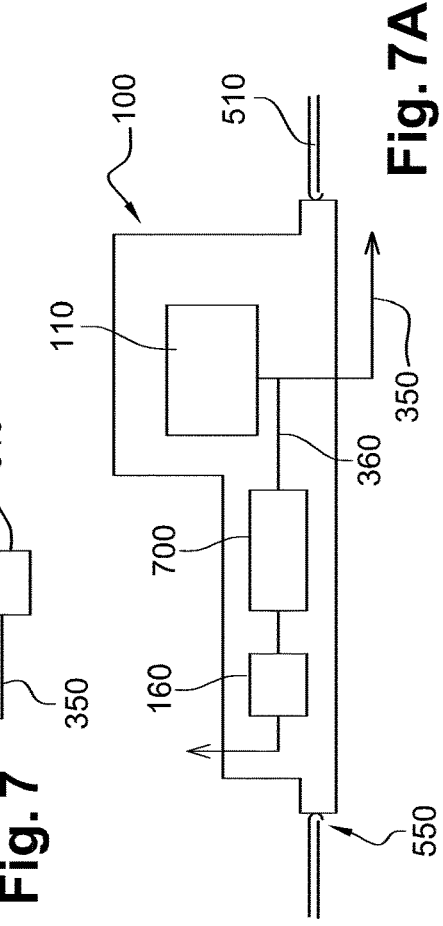

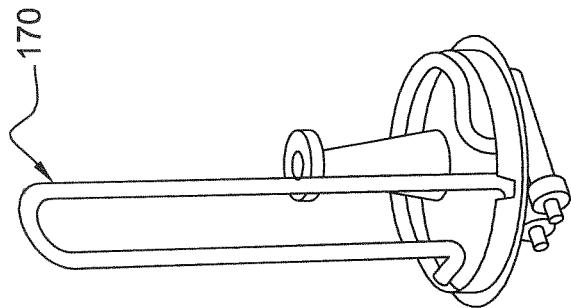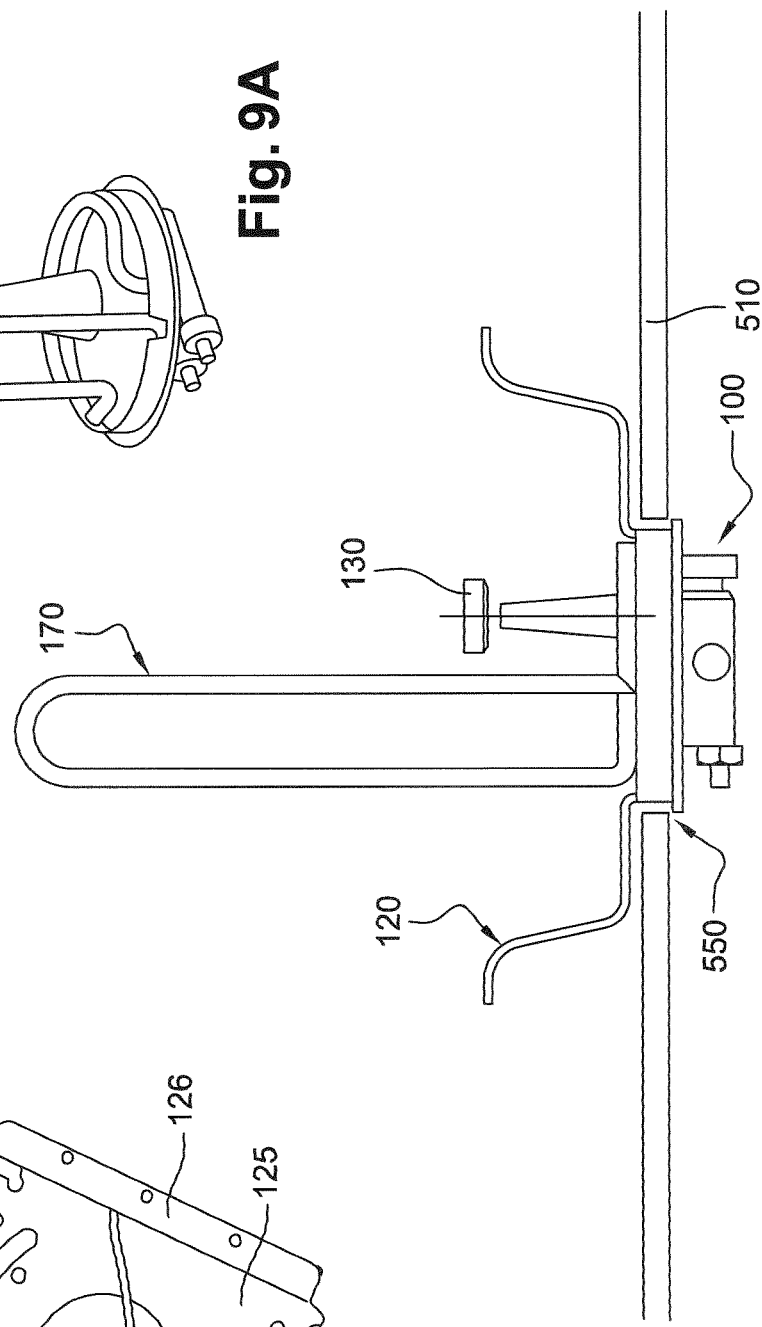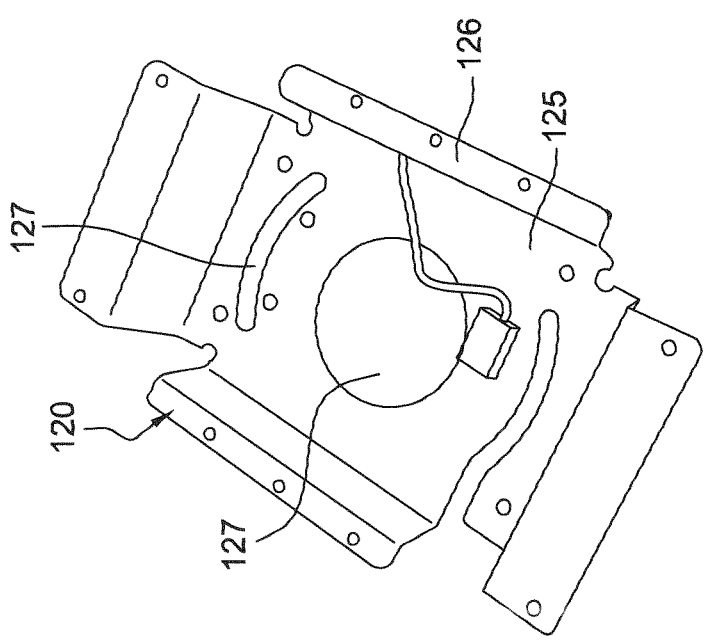
Fig. 9A
Fig. 9B
Fig. 9

SYSTEM AND METHOD FOR INJECTING AN AQUEOUS SOLUTION ON-BOARD A VEHICLE

FIELD OF INVENTION

The invention relates to a system and method for injecting an aqueous solution, preferably demineralised water, on-board a vehicle, and in particular for injecting an aqueous solution into an air intake upstream of a combustion chamber or directly in the combustion chamber.

BACKGROUND

It is known to inject water into an air intake upstream of a combustion chamber or directly in the combustion chamber, when the load of the engine of the vehicle is high. By injecting water in the air stream, the air is cooled down, resulting in a higher density and hence more air per volume unit, enhancing the combustion. In that manner more power is obtained, i.e. the performance is boosted.

The water for injection needs to be stored on-board the vehicle, typically for a longer period of time, before all the water has been used for injection. It is known to add additives to the water to maintain the water in a suitable condition. However, such additives may hinder a good operation of the combustion chamber and may damage the fuel injector of the combustion chamber.

SUMMARY

It is an object of exemplary embodiments of the invention to provide a vehicle system for injecting an aqueous solution on-board a vehicle, and in particular for injecting an aqueous solution into an air intake upstream of a combustion chamber or directly in the combustion chamber, which is capable of storing an aqueous solution in suitable conditions for a longer period of time. More in particular, it is an object of embodiments of the invention to provide a vehicle system which can be used with various types of aqueous solutions, including drinking water and water from natural sources containing bacteria and algae.

According to an aspect there is provided a vehicle system for injecting an aqueous solution, said vehicle system comprising: a tank for storing an aqueous solution; an injection system configured for injecting aqueous solution from the tank in an injection zone (Z) in the vehicle; and a UV light decontamination device configured for decontaminating the aqueous solution stored in the tank by emitting UV light.

By subjecting the aqueous solution to UV light bacteria and algae can be inactivated in order to decontaminate the aqueous solution. In that manner the aqueous solution can be stored in suitable conditions on-board a vehicle for a longer period of time without the need for special additives.

Preferably, the UV light decontamination device is arranged in the tank.

In an exemplary embodiment, the UV light decontamination device contains a fluid passage and is configured to emit UV light in said fluid passage, and wherein the vehicle system is configured for transferring aqueous solution stored in the tank through said fluid passage. Such a fluid passage may be located inside or outside the tank.

In an exemplary embodiment the fluid passage is coated with a photocatalyst, for example titanium dioxide ($TiO_2$). $TiO_2$ can be used as a catalyst in combination with UV radiation for water decontamination. Upon UV irradiation, activated $TiO_2$ yields photocatalytically generated reactive oxygen species (ROS), such as hydroxyl radicals (—HO), hydrogen peroxide ($H_2O_2$), and superoxide anion ($O_2^-$). The generated ROS can decompose inorganic and organic pollutants and inactivate microorganisms, bacteria, fungi, and viruses.

The fluid passage may be delimited by a wall made of a UV-resistant material. Further also the tank may be made of a UV-resistant material. More preferably, the tank comprises an outer layer and inner layer made of UV-resistant material.

Preferably, the vehicle system further comprises a pump unit. The pump unit may be arranged inside the tank. By arranging the pump unit in the tank, a compact system is obtained. Further only one line (the feed line) is required from the tank (which may be located e.g. in the back of the car) to the injector (which is typically located close to the engine). It is noted that other lines may be provided but this is not required. In an embodiment the pump unit is arranged in a module mounted in an opening of a wall of the tank. The pump unit may then be arranged either inside the tank or at an external side of the module on the outside of the tank, or partially inside and partially outside of the tank. By arranging the pump in a module mounted in an opening in the tank a compact system is obtained which can be assembled easily. Further only one line (the feed line) is required from the module (which may be located e.g. in the back of the car) to the injector (which is typically located close to the engine). It is noted that other lines may be provided but this is not required. The injection system may comprise an injector and a feed line connecting the pump unit to the injector such that aqueous solution from the tank can be pumped to the injector. Further a return line may connect an outlet of the pump unit with the interior of the tank. The UV light decontamination device may be arranged in the return line. Preferably, the return line is connected to the feed line (i.e. to the outlet of the pump unit) in the module. This results in a very short return line and hence in an even more compact system. Furthermore, the return line may comprise a valve, and the UV light decontamination device may be arranged in the return line, downstream or upstream of the valve.

Preferably, the fluid passage is arranged such that the pump unit can transfer aqueous solution through said fluid passage. In this way, the aqueous solution of the tank can be treated continuously with UV light when the pump unit is on whilst the pump unit may at the same time be used for pumping aqueous solution to the injector. Alternatively the pump unit may be arranged and controlled to be in an injection mode or in a bio-decontamination mode, wherein the pump unit is used for pumping aqueous solution through the fluid passage in the bio-decontamination mode and for pumping aqueous solution to the injector in the injection mode.

In an exemplary embodiment, the UV light decontamination device is integrated in a module mounted in an opening of the tank. Additionally or alternatively, the pump unit is also integrated in the module.

The module may further comprise any one or more of the following components: a heater, a level sensor, a quality sensor, a filter, a bowl defining a fluid compartment in the tank.

In an exemplary embodiment the tank has a bottom wall, a top wall and a sidewall connecting the bottom wall with the top wall. Preferably, the opening is arranged in the bottom wall, wherein, in the mounted position of the tank, the bottom wall corresponds with the lowest face of the tank. Such an embodiment has the advantage that the components integrated in the module are located in low position of the tank. For example, for a pump unit or a bio-decontamination device integrated in the module, this has the advantage that the connection lines can be short.

In another exemplary embodiment the opening is arranged in the sidewall, in a lower half of the tank, wherein, in the mounted position of the tank, the bottom wall corresponds with the lowest face of the tank.

In an exemplary embodiment the UV light decontamination device is configured to emit UV light from a central location in the tank to a sidewall of the tank. In such an embodiment, the sidewall may be provided with a reflector. In that manner the whole content of the tank may be decontaminated without having to circulate the aqueous solution. In another embodiment where a bowl or swirl pot is integrated in the module, the UV light decontamination device may be configured to emit UV light into the aqueous solution in the bowl, such that aqueous solution pumped out of the bowl to the injector is bio-decontaminated. In such an embodiment, an inner wall of the bowl may be provided with a reflector.

Preferably, the vehicle system comprises a jet pump having a suction inlet, a pressure inlet and an outlet, said pump unit being connected for pumping aqueous solution along a jet flow path from the tank through the pump unit, through the pressure inlet of the jet pump to the outlet of the jet pump, wherein said outlet is arranged for returning aqueous solution from the suction inlet and from the pressure inlet to the tank.

In an exemplary embodiment, the pump unit is a feed pump unit connected for pumping aqueous solution directly from the tank or from a compartment in fluid communication with aqueous solution in the tank (e.g. the above described bowl or swirl pot) to a feed outlet for feeding aqueous solution out of the tank or out of the compartment, respectively. The pump unit is also connected for pumping aqueous solution along a flow path from the compartment through the pump unit, through the pressure inlet of the jet pump to the outlet of the jet pump. The outlet is arranged for returning aqueous solution from the suction inlet and from the pressure inlet directly to the tank or to the compartment. In an embodiment with a compartment in the tank, the suction inlet may be arranged to suck aqueous solution present in the tank into the compartment. In an embodiment with a compartment in the form of a second separate tank, the suction inlet may be arranged to suck liquid from the second tank into the tank associated with the pump unit.

Preferably the jet pump is arranged in the same module as the feed pump unit. Preferably, this module is mounted in an opening of a wall of the tank, more preferably the bottom wall of the tank. In alternative embodiments, the jet pump may be provided as a separate module mounted inside or outside of the tank, and e.g. as a separate module mounted in an opening in a wall of the second tank.

The UV light decontamination device may be arranged to operate on fluid flowing in the jet flow path, such as a UV light decontamination device being arranged at one of an inlet of the pump unit, an outlet of the pump unit, a driving line connecting the outlet of the pump unit to the pressure inlet of the jet pump, the pressure inlet of the jet pump, the outlet of the jet pump.

Alternatively or additionally, the UV light decontamination device may be arranged to operate on fluid flowing to the suction inlet. In a particular embodiment, said suction inlet is connected to a suction line arranged for receiving aqueous solution from one of a compartment in the tank and a second tank for storing an amount of aqueous solution. The UV light decontamination device may then be arranged in the suction line, either inside or outside of the tank. In a particular example, the UV light decontamination device may be arranged to operate on both the fluid flowing in the jet flow path and on fluid flowing to the suction inlet. In this example, the UV light decontamination device may be configured to provide the UV light to the fluid in the jet flow path and in the suction line, which is connected to the suction inlet.

Preferably, the aqueous solution contains at least 90% water, more preferably at least 95% water, and most preferably at least 98% water; wherein the aqueous solution is for example demineralized water. For such aqueous solutions a UV light decontamination device will be particularly effective.

It is a further object of exemplary embodiments of the invention to provide a vehicle system for injecting liquid with an improved heating system.

According to a further aspect there is provided a vehicle system for injecting liquid, said vehicle system comprising: a tank for storing liquid; a module arranged in an opening in a wall of the tank; a tubing for transporting a heat exchange fluid, e.g. engine coolant, said tubing extending in the tank and being fixed in said module or integrated in said module; an electrical heater arranged in the tank and/or in the module.

Using an electrical heater has the advantage that immediate heater power is available reducing the start-up time at cold temperatures. The tubing may be used for circulating engine coolant. The heater power of tubing will depend on engine heat up speed, and without the electrical heater the start-up time would be much longer. By suitably combining an electrical heater with a tubing for engine coolant an optimal heating can be achieved fulfilling the start-up requirements whilst at the same time using heat from the engine coolant once the engine is heated up sufficiently.

The vehicle system may further comprise a controller for controlling the electrical heater e.g. in function of the engine temperature or in function of the time during which the engine has been running. In that manner the heating can be adequately controlled and optimized.

In an exemplary embodiment, the electrical heater is arranged in an area surrounding the tubing.

In an exemplary embodiment the electrical heater is arranged above a bottom wall of the tank, in a lower half of the tank, wherein, in the mounted position of the tank, the bottom wall corresponds with the lowest face of the tank.

The electrical heater may be arranged on the module. Preferably the electrical heater is a flexible electrical heater. This allows the electrical heater to be brought through a rather small opening in the tank, whilst occupying a surface larger than the surface of said opening.

According to an exemplary embodiment the flexible electrical heater comprises a flexible sheet with integrated electrical tracks.

According to an exemplary embodiment the sheet extends in an area around the opening in the wall of the tank.

According to an exemplary embodiment the flexible sheet comprises two flexible films, and the at least one electrical track is arranged between the two flexible films.

According to an exemplary embodiment the flexible sheet is a sheet with a central portion extending around the tubing and at least one flap extending from the central portion in the tank.

According to an exemplary embodiment the sheet is a sheet with a central portion extending around the tubing and four flaps extending from the central portion in the tank.

According to an exemplary embodiment the flexible electrical heater comprises a plurality of flexible tentacles extending freely in the tank.

According to an exemplary embodiment the flexible electrical heater comprises one or more openings, and one or more components mounted in the tank or on the module extend through said one or more openings.

According to an exemplary embodiment the tank has a bottom wall, a top wall and a sidewall connecting the bottom wall with the top wall, the opening is arranged in the bottom wall, and, in the mounted position of the tank, the bottom wall corresponds with the lowest face of the tank.

According to another exemplary embodiment the tank the opening is arranged in the sidewall, in a lower half of the tank.

According to an exemplary embodiment the vehicle system further comprises a pump unit integrated in the module.

According to another exemplary embodiment the vehicle system further comprises a pump unit inside the tank.

According to an exemplary embodiment the electrical heater is arranged around the pump unit.

According to an exemplary embodiment the vehicle system further comprises a feed line connecting the pump unit to the injector such that aqueous solution from the tank can be pumped to the injector.

According to an exemplary embodiment the module further comprises any one or more of the following components: a level sensor, a quality sensor, a filter, a biodecontamination device such as a UV light decontamination device.

According to an exemplary embodiment the aqueous solution contains at least 90% water, more preferably at least 95% water, and most preferably at least 98% water; the aqueous solution is for example demineralized water.

The invention is especially advantageous for gasoline cars but may also be useful for diesel cars.

Further preferred embodiments are disclosed in the dependent claims.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIG. 3 illustrates a section of an exemplary embodiment of a module with a pump mounted in a wall of the tank;

FIG. 4 illustrates a perspective view of an exemplary embodiment of a module with a pump and a heater;

FIG. 5 illustrates a perspective view of another exemplary embodiment of a module with a pump and a heater;

FIG. 7 illustrates a further exemplary embodiment of a vehicle system with a UV light decontamination device inside the tank;

FIGS. 7A, 8 and 8A illustrates further exemplary embodiments of a vehicle system with a UV light decontamination device integrated in a module mounted in an opening in the tank;

FIGS. 9, 9A and 9B illustrate an exemplary embodiment of a vehicle system with an electrical heater and a heat exchanger;

DESCRIPTION OF EMBODIMENTS

Figure 1:
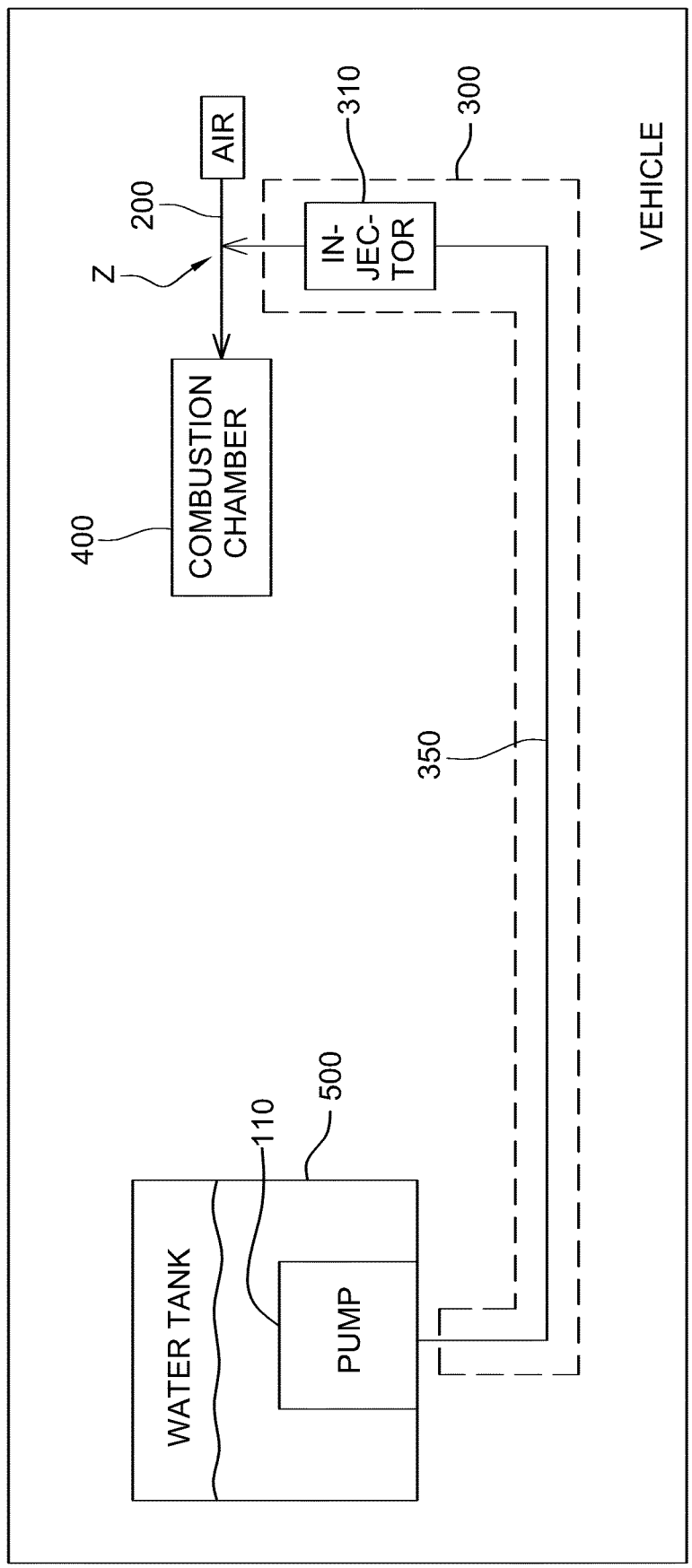
FIG. 1 illustrates schematically an exemplary embodiment of a vehicle system with a pump inside the tank.

FIG. 1 illustrates a vehicle system for injecting an aqueous solution in an air intake line upstream of a combustion chamber of an internal combustion engine. Alternatively the aqueous solution may be injected directly in the combustion chamber of the internal combustion engine. More generally the aqueous solution may be injected anywhere as long as the injection is such that the air injected in the combustion chamber is cooled. The aqueous solution is preferably a solution containing at least 90% water, more preferably at least 95% water, and most preferably at least 98% water. The aqueous solution is e.g. demineralized water. In other embodiments an amount of methanol may be added to the aqueous solution to lower the freezing point.

The vehicle system of FIG. 1 comprises a tank 500 for storing the aqueous solution; a pump unit 110 inside tank 500; an air intake line 200 upstream of a combustion chamber 400 of an internal combustion engine; an injector 310 configured for injecting aqueous solution in air intake line 200; a feed line 350 connecting pump unit 110 to said injector 310 such that aqueous solution from the tank 500 can be pumped to the injector 310. By arranging the pump unit 110 in the tank, the injection system (feed line 350 and injector 310) can have a simple configuration. Generally it will be sufficient to have one line (feed line 350) between tank 500 and injector 310. Indeed, if the pump were to be located close to the injector, typically there will be needed a long return line. If tank 500 is located in the back of the car, by providing pump 110 inside tank 500 there is a significant reduction in required line length compared to prior art solutions where the pump is located in the engine compartment.

Alternatively, the vehicle system as shown in FIG. 1 may comprise a plurality of injectors 310 configured for injecting aqueous solution in the air intake line 200. In this modified embodiment, at least one feed line 350 is arranged for connecting pump unit 110 to said injectors such that aqueous solution from the tank 500 can be pumped to the corresponding injectors.

Figure 2:
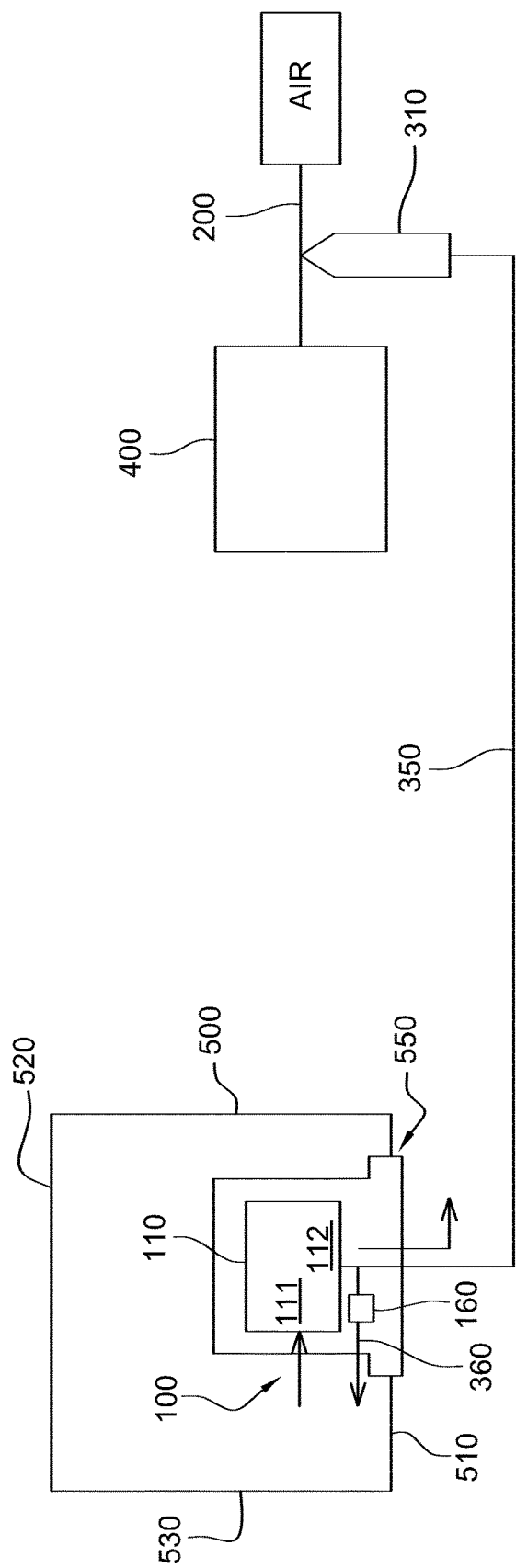
FIGS. 2 and 2A, illustrate two variants of vehicle systems with a pump integrated in a module mounted in a wall of the tank.

FIG. 2 illustrates an exemplary embodiment similar to the embodiment of FIG. 1, where pump unit 110 is arranged in a module 100. The module 100 is mounted in a opening 550 in the tank 500. Tank 500 has a bottom wall 510, a top wall 520 and a sidewall 530 connecting the bottom wall 510 with the top wall 520. In the illustrated embodiment the opening 550 is arranged in the bottom wall 510, wherein, in the mounted position of the tank 500, the bottom wall 510 corresponds with the lowest face of the tank 500. In another non-illustrated embodiment the opening 550 may be arranged in the sidewall 530, in a lower half of the tank 500.

Figure 2A:
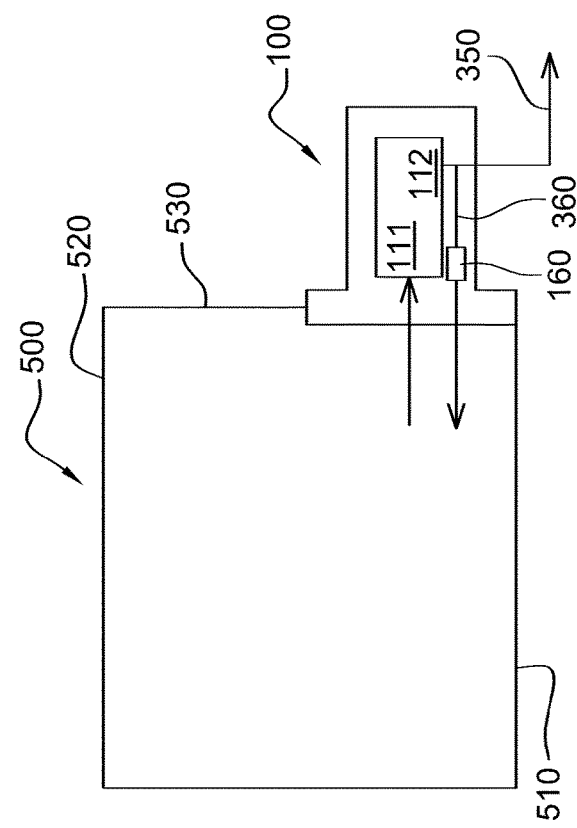

In another exemplary embodiment pump unit 110 may be arranged in a module 100, outside the tank, see FIG. 2A. In this embodiment the module is arranged in sidewall 530, in the lower half of tank 500. In another non-illustrated embodiment module 100 of FIG. 2A may be arranged in bottom wall 510.

In the exemplary embodiments of FIGS. 2 and 2A, module 100 may further comprise any one or more of the following components (not shown): a heater for heating the aqueous solution in tank 500; a level sensor for sensing the level of the aqueous solution in tank 500; a quality sensor for measuring the quality of the aqueous solution in tank 500; a filter, optionally integrated in pump unit 110 for filtering the aqueous solution before it is transported through feed line 350; a bio-decontamination device configured for decontaminating the aqueous solution in tank 500 e.g. using UV light; a controller for controlling any one or more of the components of the module 100.

In the exemplary embodiments of FIGS. 2 and 2A, the vehicle system further comprises a return line 360 integrated in the module 100. Return line 360 connects the feed line 350 with the interior of the tank 500. Return line 360 is connected to feed line 350 in module 100. Return line 360 comprises a check valve 160 in order to regulate the return flow. Pump unit 110 has an inlet 111 for receiving aqueous solution from the tank and an outlet 112 connected to feed line 350. It is noted that FIGS. 2 and 2A are schematic drawings and that inlet 111 is preferably located as low as possible in the tank, and more generally below the minimum filling level. Pump unit 110 may comprise e.g. a gear pump.

FIG. 3 illustrates a more detailed embodiment of a module 100 adapted for mounting in an opening 550 of bottom wall 510 of tank 500. Module 100 comprises a cylindrical compartment 105, and a pump unit 110 arranged in cylindrical compartment 105. Pump unit 110 comprises a gear pump 113 and a motor 114 (e.g. a BLDC motor). Pump unit 110 has an inlet 111 at the lower end of a cylindrical housing 115 of pump unit 110. In this embodiment a filter 150 is integrated in pump unit 110. The outlet 112 of pump unit 110 is located at a lower end of pump unit 110, below gear pump 113. Outlet 112 is connected to a first portion of feed line 350. This portion of feed line 350 is connected to a return line 360 including a check valve 160. Return line 360 is integrated in module 100 and is located partially below pump unit 110. The outlet of return line 360 is located adjacent to pump unit 110, and returns the aqueous solution into tank 500. A heater 120 is provided adjacent cylindrical compartment 105 of module 100. Heater 120 is preferably an electrical heater. In the illustrated embodiment the heater is a flexible electrical heater 120 with flexible tentacles 121 extending in tank 500. However, it is also possible to provide non-flexible electrical heating elements (not shown), e.g. PTC (Positive Temperature Coefficient) heating elements, adjacent to cylindrical compartment 115, e.g. attached to the inside or the outside of this cylindrical compartment. In the illustrated embodiment cylindrical housing 115 of pump unit 110 contains a separation wall 116 dividing the housing in an upper compartment for motor 114 and a lower compartment for gear pump 113. Aqueous solution enters the lower compartment of cylindrical housing 115 at the bottom thereof, see inlet 111, passes through filter 150 and leaves the lower compartment at outlet 112.

FIG. 4 illustrates another detailed embodiment of a module 100 adapted for mounting in an opening 550 of bottom wall 510 of tank 500 in a similar manner as shown in FIG. 3. Module 100 comprises compartment 105, and a pump unit 110 arranged in compartment 105. Pump unit 110 may comprise a gear pump 113 and a motor 114. Pump unit 110 may have an inlet (not visible) at the lower end of pump unit 110. The outlet (not visible) of pump unit 110 may be located at a lower end of pump unit 110. The module 100 may comprise a portion of feed line and a return line including a check valve, as in the embodiment of FIG. 3. A heater 120 is provided adjacent compartment 105 of module 100, and may be attached to compartment 105. Heater 120 is preferably an electrical heater. In the illustrated embodiment the heater is a flexible electrical heater 120 with flexible tentacles 121 extending in tank 500. However, it is also possible to provide non-flexible electrical heating elements (not shown), e.g. PTC heating elements, adjacent to compartment 115, e.g. attached to the inside or the outside of this compartment 105. Compartment 105 has an outer wall with a shape which is such that an inner volume is created for receiving the pump unit 110, and a small outer volume 106 for receiving a level sensor 130. The outer wall of compartment surrounds partially level sensor 130 in order to protect the level sensor.

FIG. 5 illustrates another detailed embodiment of a module 100 adapted for mounting in an opening 550 of bottom wall 510 of tank 500 in a similar manner as shown in FIG. 3. Module 100 comprises a compartment 105, and a pump unit 110 arranged in compartment 105. Pump unit 110 may comprise a gear pump 113 and a motor 114. Pump unit 110 may have an inlet (not visible) at the lower end of pump unit 110. The outlet (not visible) of pump unit 110 may be located at a lower end of pump unit 110. The module 100 may comprise a portion of feed line and a return line including a check valve, as in the embodiment of FIG. 3. A heater 120 is provided adjacent cylindrical compartment 105 of module 100. Heater 120 is preferably an electrical heater. In the illustrated embodiment the heater is a flexible electrical heater 120 comprising a central portion 125 intended for extending parallel to a wall of the tank 500, and four flaps 126 which may be attached to tank portions on the inside of the tank. Central portion 125 is provided with an opening through which compartment 105 protrudes. Compartment 105 has a shape which is such that an inner volume is created for receiving the pump unit 110, and a further volume 106 for receiving a level sensor 130.

In exemplary embodiments of the invention, preferably, the pump unit 110 is configured to be able generate a flow of between 60 and 100 kg/h through the feed line 350. Further, the controller is preferably configured to control pump unit 110 in function of the RPM (Revolutions Per Minute) of the vehicle. When the RPM reaches a predetermined threshold, the pump unit 110 is made to pump with a flow speed within a predetermined range.

Although a gear pump is advantageous for use in exemplary embodiments, also other pumps may be used, e.g. a gerotor pump, a positive displacement pump, a turbine pump, a membrane pump, a piston pump.

Figure 6A:
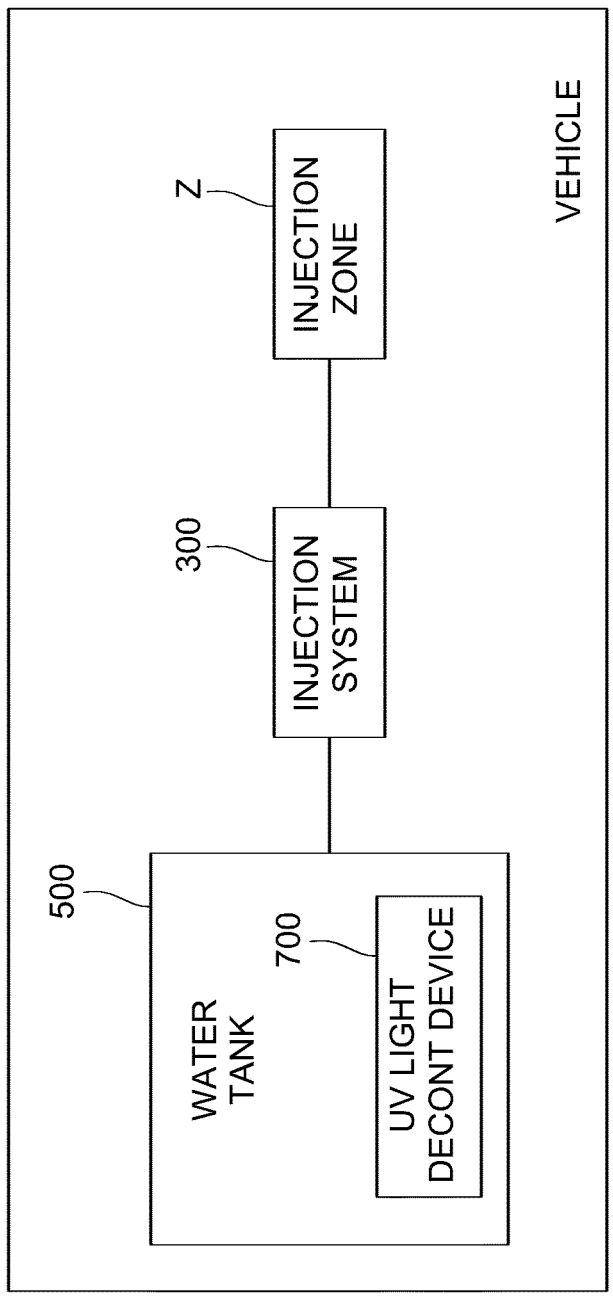
FIG. 6A illustrates schematically an exemplary embodiment of a vehicle system with a UV light decontamination device inside the tank.
Figure 6B:
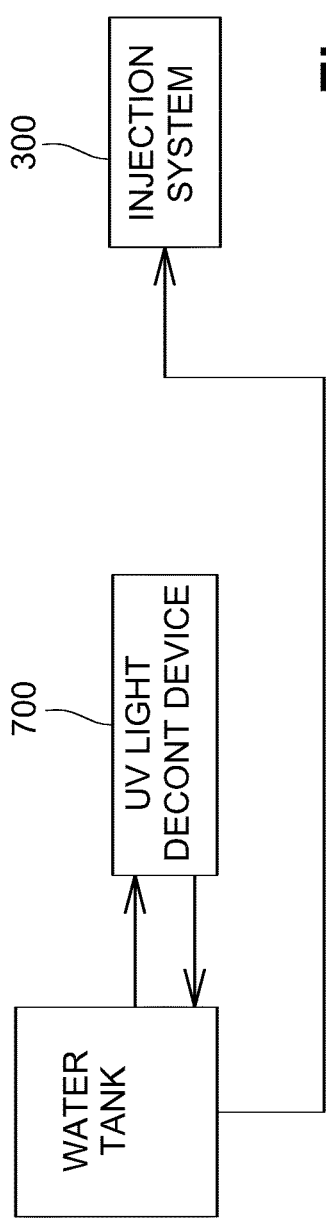
FIG. 6B illustrates schematically an exemplary embodiment of a vehicle system with a UV light decontamination device outside the tank.

FIGS. 6A and 6B illustrate further exemplary embodiments of a vehicle system for injecting an aqueous solution.

The vehicle system comprises a tank 500 for storing an aqueous solution; an injection system 300 configured for injecting aqueous solution from the tank 500 in an injection zone Z in the vehicle; and a UV light decontamination device 700 configured for decontaminating the aqueous solution stored in the tank 500 by emitting UV light. In the embodiment of FIG. 6A, the UV light decontamination device 700 is arranged in the tank 500, and in the embodiment of FIG. 6B the UV light decontamination device 700 is arranged outside the tank 500, but in fluid communication with the tank 500 such that aqueous solution runs through the UV light decontamination device 700.

As illustrated in FIG. 7, the UV light decontamination device 700 may contain a fluid passage 720 and may be configured to emit UV light in said fluid passage. The vehicle system is then configured for transferring aqueous solution stored in the tank 500 through said fluid passage 720, e.g. using a pump which may be the same pump as the pump 110 used for transporting aqueous solution out of the tank to feed line 350, but may also be a different pump. In the embodiment of FIG. 7A, the same pump 110 is used for pumping fluid to through feed line 350 to an injector 310, and through the UV light decontamination device 700. This may be achieved as illustrated by placing the UV light decontamination device 700 in the return line 360 connecting the feed line 350 with the interior of the tank 500. Here UV light decontamination device 700 is located upstream of valve 160, but this could also be downstream of valve 160. Preferably, the return line 360 is connected to the feed line 350 in the module 100. The skilled person understands that also other configurations are possible wherein the same pump is used for the feeding of aqueous urea solution to the injector and for the feeding of the UV light decontamination device 700. The fluid passage 720 is delimited by a wall 710 made of a UV-resistant material. UV light sources may be integrated in the wall 710.

FIG. 8 illustrates an embodiment where the UV light decontamination device 700 is configured to emit UV light in the interior of tank 500. In the embodiment of FIG. 8 the UV light is emitted upwardly, and in the embodiment of FIG. 8A the UV light is emitted sideward in the direction of the side wall 530. More in particular, in FIG. 8A the UV light decontamination device 700 is configured to emit UV light from a central location in the tank 500 to the sidewall 530 of the tank 500. The skilled person understands that also combinations thereof or variations thereof are possible. Also there may be provided suitably positioned reflectors 740 for reflecting the UV-light back in the tank, e.g. on the sidewall 530 as illustrated in FIG. 8A. In such embodiments the tank 500 is preferably made of a UV-resistant material. The tank 500 may comprise an outer layer and inner layer made of UV-resistant material. As illustrated in FIGS. 7A, 8 and 8A, the UV light decontamination device 700 may be integrated in a module 100 mounted in an opening 550 of the tank 500. Also pump unit 110 and return line 360 may be integrated in this module 100.

In the exemplary embodiments of FIGS. 7A, 8 and 8A, module 100 may further comprise any one or more of the following components (not shown): a heater for heating the aqueous solution in tank 500; a level sensor for sensing the level of the aqueous solution in tank 500; a quality sensor for measuring the quality of the aqueous solution in tank 500; a filter, optionally integrated in pump unit 110 for filtering the aqueous solution before it is transported through feed line 350; a controller for controlling any one or more of the components of the module 100.

In the exemplary embodiments of FIGS. 7A, 8 and 8A, module 100 is mounted in an opening arranged in the bottom wall 510 of tank 500, wherein, in the mounted position of the tank 500, the bottom wall 510 corresponds with the lowest face of the tank 500. However, it is also possible to mount module 100 in an opening arranged in the sidewall 530, in a lower half of the tank 500.

FIG. 9 illustrates a vehicle system for injecting liquid, said vehicle system comprising a tank 500 for storing liquid, a module 100 arranged in a opening 550 in a wall of the tank 500; a tubing 170 for transporting a heat exchange fluid, said tubing extending in the tank 500 and being fixed in said module 100; and an electrical heater 120. FIGS. 9A and 9B illustrate a detailed view of a possible electrical heater and of a module with tubing 170, respectively. In the illustrated embodiment the electrical heater 120 is attached to the module 100. However, in other embodiments the electrical heater may be arranged against an inner wall of the tank. In the illustrated embodiment the tubing 170 is sealingly fixed in the module 100. However, it is also possible to have a module with an integrated tubing. Preferably, the electrical heater 120 is arranged in an area surrounding the tubing 170. The electrical heater 120 may be arranged above a bottom wall 510 of the tank, in a lower half of the tank, wherein, in the mounted position of the tank 500, the bottom wall 510 corresponds with the lowest face of the tank 500.

Preferably, the electrical heater 120 is a flexible electrical heater comprises a flexible sheet with integrated electrical tracks. Preferably the sheet extends in an area around an opening 550 in the wall, typically bottom wall 510 of the tank 500. The flexible sheet may comprise two flexible films, and wherein at least one electrical track is arranged between the two flexible films. As illustrated in FIG. 9B the sheet may be a sheet with a central portion 125 extending around the tubing 170 and at least one flap 126 may extend from the central portion 125 in the tank 500. It is noted that there could also be provided a module similar to the module of FIG. 4, wherein a tubing 170 is added adjacent the pump unit 110. In such an embodiment the flexible electrical heater 120 may comprise a plurality of flexible tentacles 121 extending freely in the tank 500. The module 100 may further comprise a UV light decontamination device, such as a UV light decontamination device 700 of any one of the embodiments shown in FIGS. 7A, 8 and 8B, wherein the UV light decontamination device 700 is mounted on the module 100 or integrated in the module 100.

Figure 10:
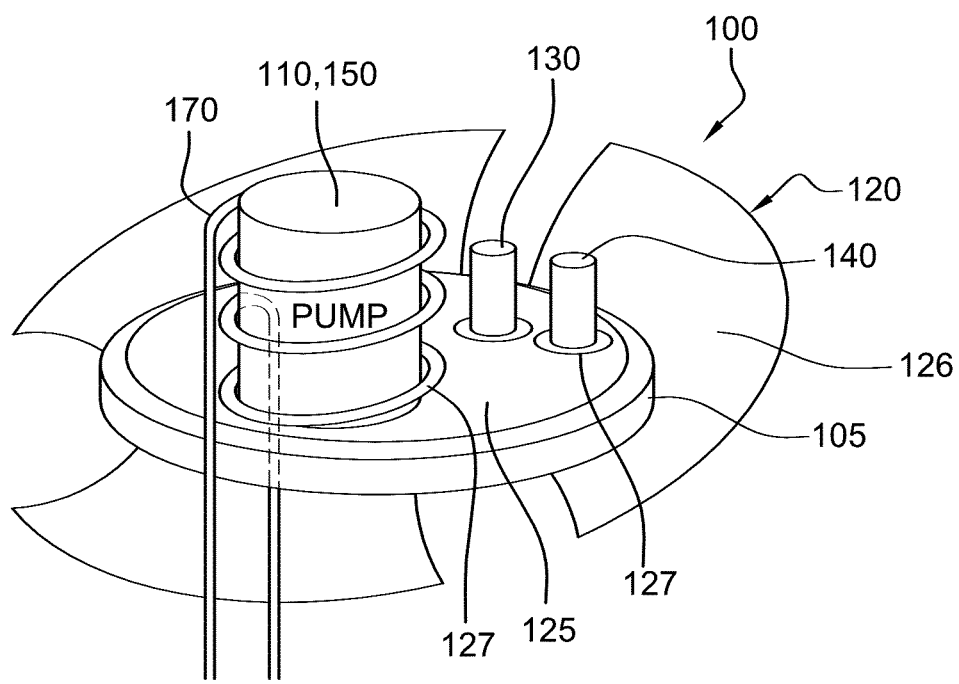
FIG. 10 illustrates another exemplary embodiment of a vehicle system with an electrical heater and a heat exchanger.

FIG. 10 illustrates a similar embodiment with a tubing 170 and a flexible electrical heater 120. In this embodiment the flexible electrical heater 120 is provided with a number of openings. Components, such as pump unit 110, level sensor 130, quality sensor 140, may be mounted on the module and may protrude through said openings. As illustrated the tubing 170 may have various shapes. Preferably the tubing has a shape which is such that the module 100 can be mounted in an opening 550 in the tank 500 from the outside; in other words tubing 170 should fit through the opening 550. The module 100 may further comprise a UV light decontamination device, such as a UV light decontamination device 700 of any one of the embodiments shown in FIGS. 7A, 8 and 8B, wherein the UV light decontamination device 700 is mounted on the module 100 or integrated in the module 100.

Figure 11:
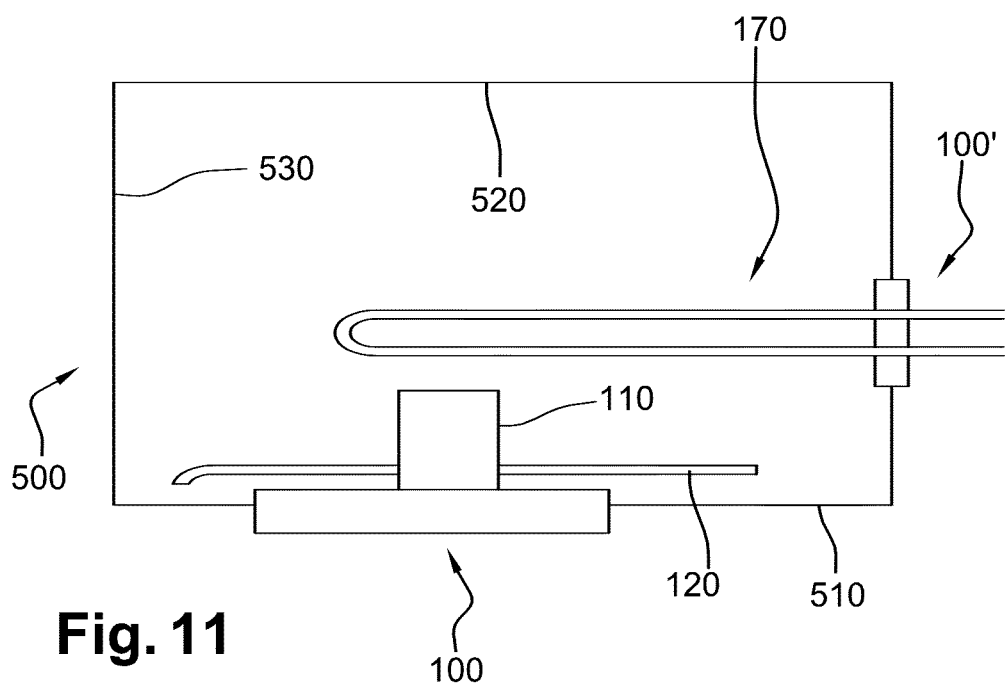
FIG. 11 illustrates another exemplary embodiment of a vehicle system with an electrical heater and a heat exchanger.

FIG. 11 illustrates a further embodiment with a tubing 170 and an electrical heater 120. In this embodiment two modules 100, 100' are provided. Module 100' carries the tubing 170 and is mounted in the sidewall 530, and module 100 carries electrical heater 120 and a pump 110. Module 100 is mounted in the bottom wall 510 of the tank 500. The electrical heater 120 is arranged around the pump unit 110. Module 100 or 100' may further comprise any one or more of the following components: a level sensor, a quality sensor, a filter optionally integrated in pump unit 110, a bio-decontamination device 700 such as a UV light decontamination device. In particular, the module 100 may comprise the UV light decontamination device 700 in a similar way as any one of the embodiments shown in FIGS. 7A, 8 and 8B, wherein the UV light decontamination device is mounted on the module 100 or integrated in the module 100.

In the embodiments of FIGS. 9, 10 and 11 using an electrical heater 120 has the advantage that immediate heater power is available reducing the start-up time at cold temperatures. A supply rate of the electrical heater may be between 150 and 350 g/h. The tubing 170 is used for circulating engine coolant. The heater power of tubing 170 will depend on engine heat up speed, and without the electrical heater 120 the start-up time will be much longer. By suitably combining an electrical heater with a tubing for engine coolant an optimal heating can be achieved fulfilling the start-up requirements whilst at the same time using heat from the engine coolant once the engine is heated up sufficiently. The electrical heater may be controlled by a controller in function of the engine temperature, in order to heat more when the engine temperature is too low and less when the engine temperature is increasing.

Figure 12A:
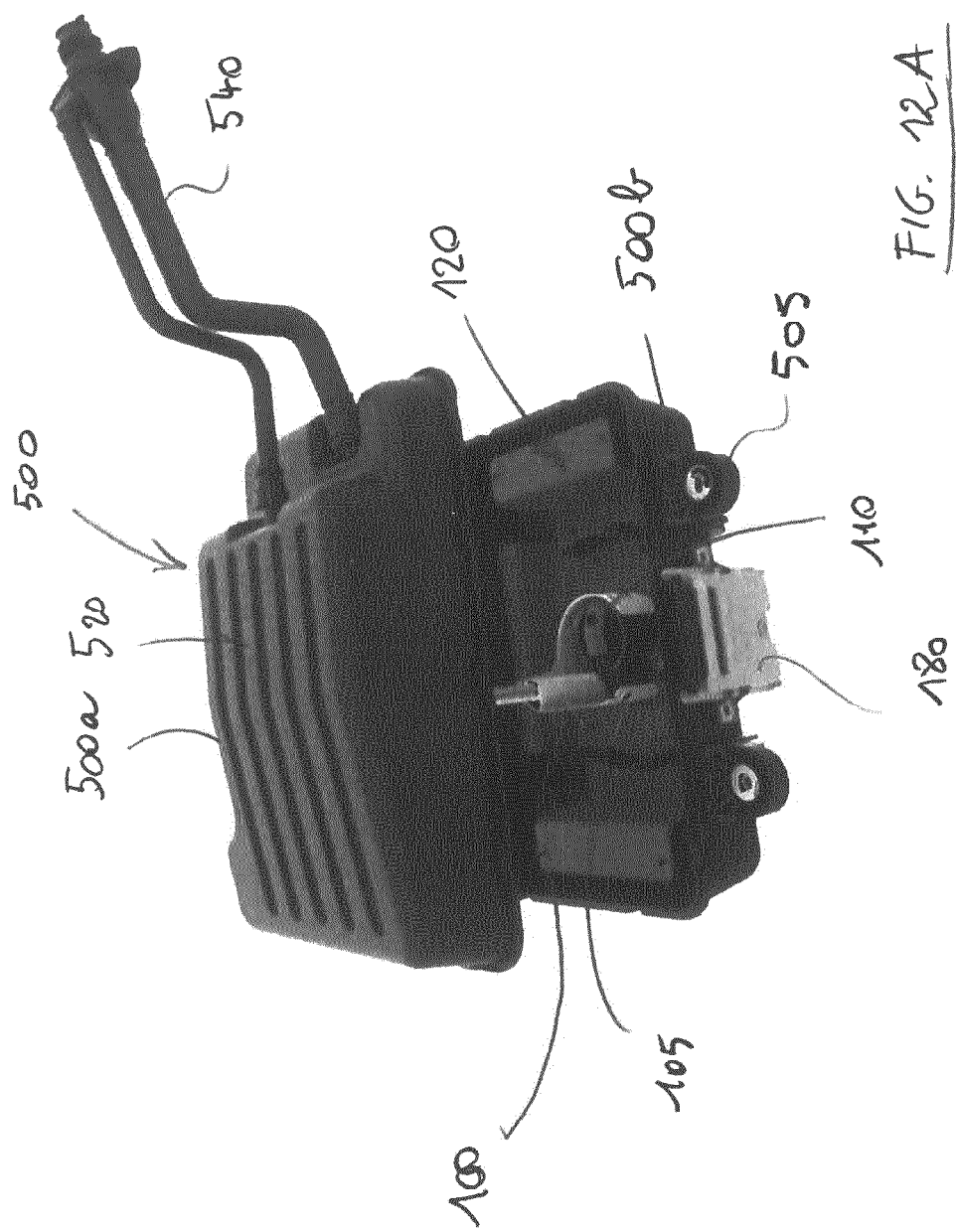
FIGS. 12A and 12B illustrate a perspective view of an exemplary embodiment of a tank of a vehicle system in which the module of FIG. 5 is arranged.
Figure 12B:
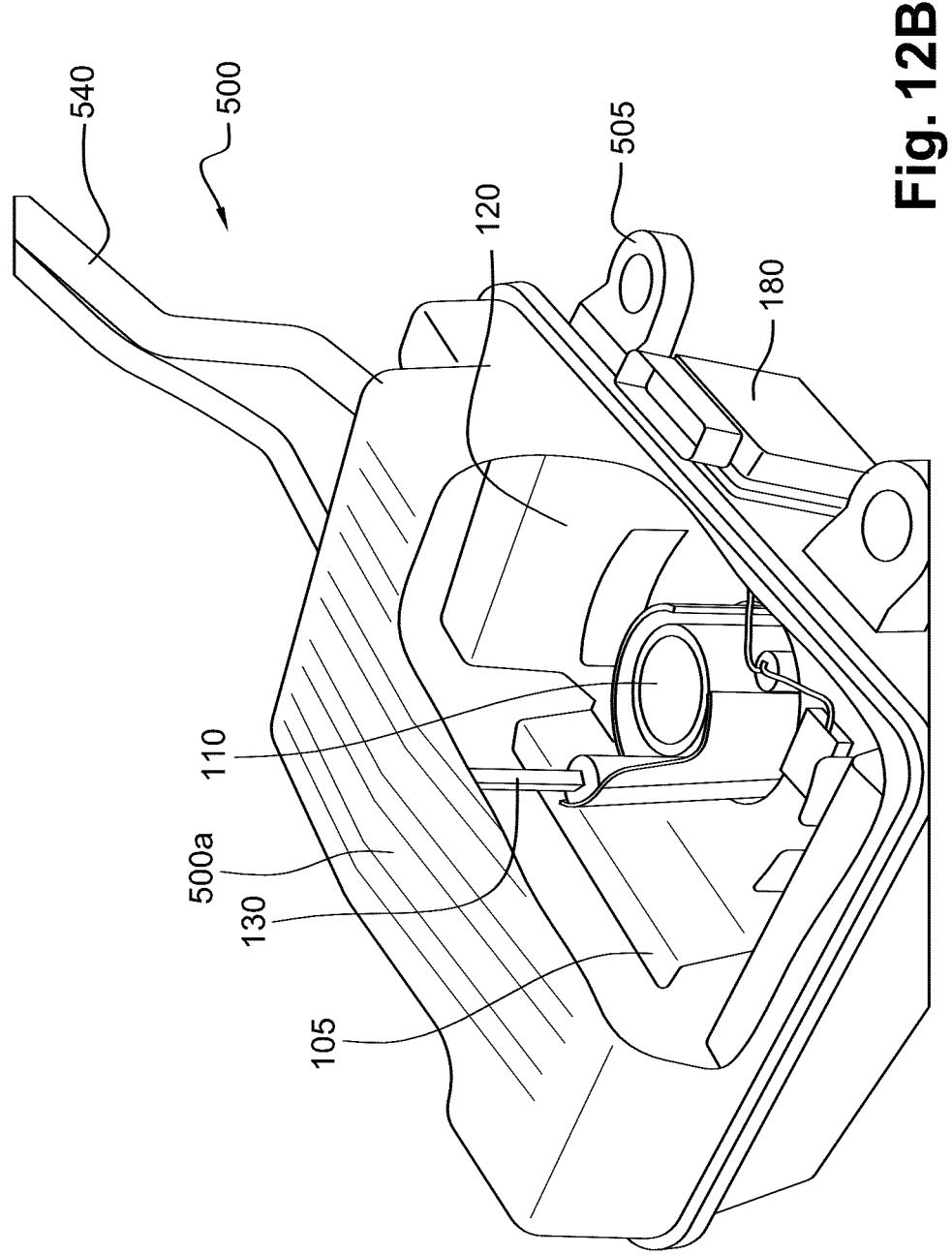

FIGS. 12A and 12B illustrate a perspective view of an exemplary embodiment of a tank of a vehicle system in which the module of FIG. 5 is arranged. The tank 500 comprises a bottom shell 500b and a top shell 500a. A flexible electrical heater 120 is arranged in the bottom shell 500b and extends over the bottom wall and a portion of the side wall 530. The flexible electrical heater 120 surrounds the compartment 105 of module 100. Attachment pads 505 may be arranged against a side wall 530 of the tank 500. Further a controller 180 may be provided to control one or more components of the module 100. The upper shell 500a is provided with a filler pipe 540 for filling the tank 500 with aqueous solution. The module 100 shown in FIGS. 12A and 12B may further comprise a UV light decontamination device, such as a UV light decontamination device 700 of any one of the embodiments shown in FIGS. 7A, 8 and 8B, wherein the UV light decontamination device 700 is mounted on the module 100 or integrated in the module 100.

Figure 13:
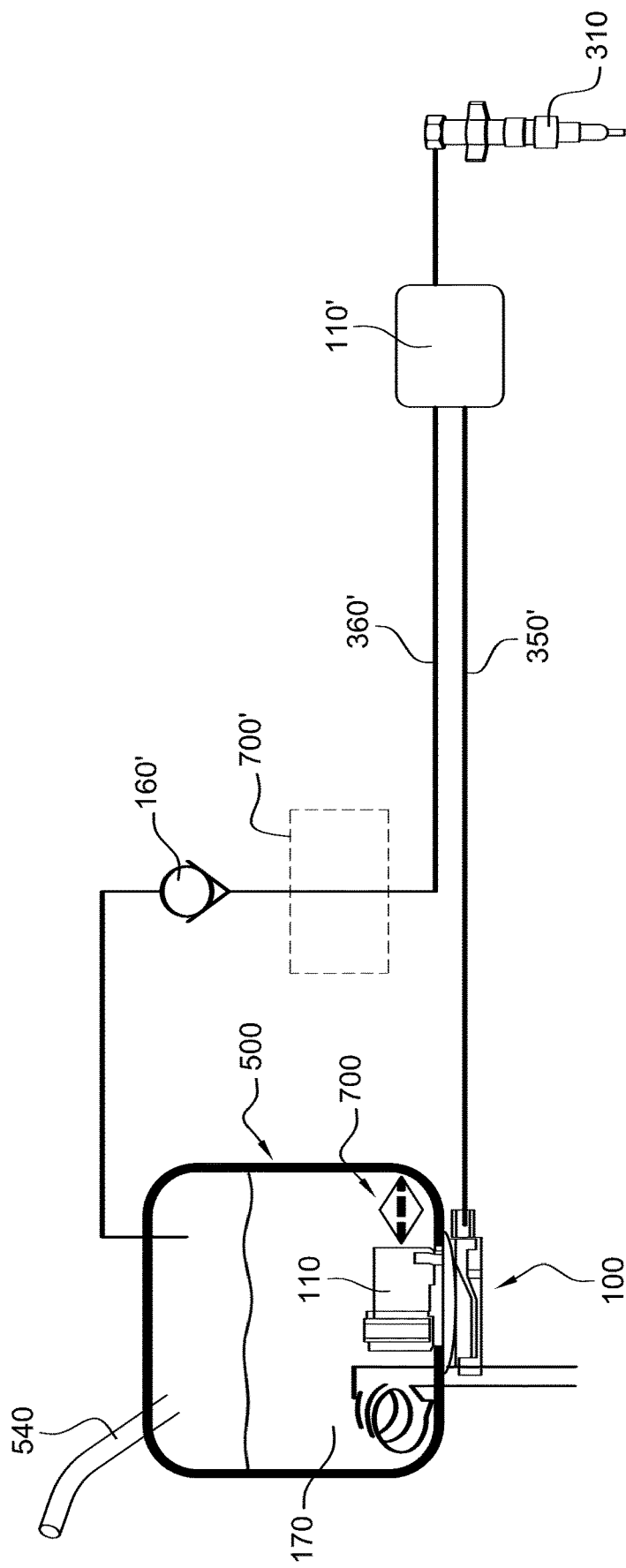
FIGS. 13 and 14 illustrate schematically further exemplary embodiments of vehicle systems.
Figure 14:
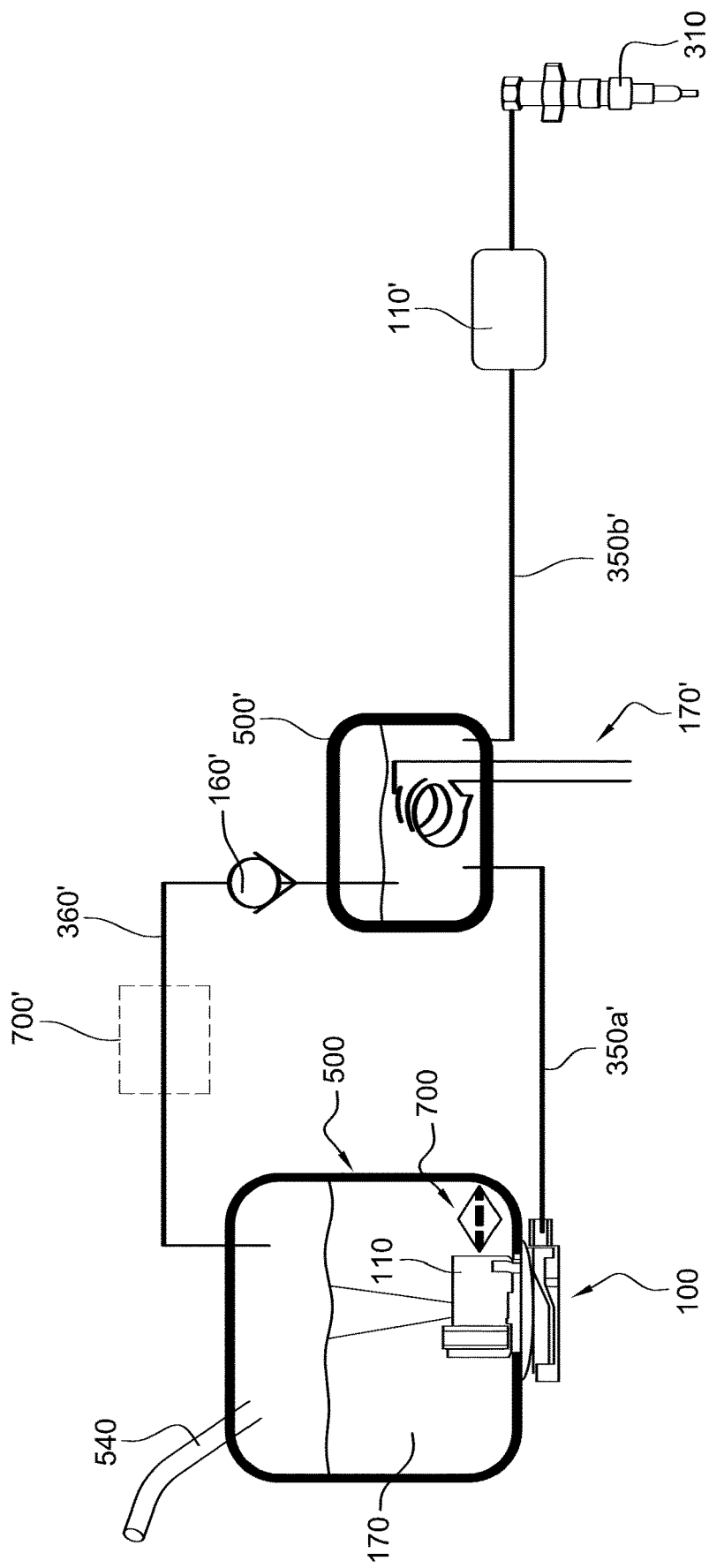

FIGS. 13 and 14 illustrate schematically further exemplary embodiments of vehicle systems. The vehicle system of FIG. 13 comprises a tank 500 for storing aqueous solution; a module 100 with first pump unit 110; an injector 310 configured for injecting aqueous solution; a feed line 350' connecting pump unit 110 to said injector 310; and a further pump unit 110' in the feed line 350'. Pump unit 110' and/or pump unit 110 allow aqueous solution from the tank 500 to be pumped to the injector 310. A return line 360' is provided from pump 110' back to the tank 500. This return line 360' comprises a check valve 160'. The module 100 may be embodied according to any one of the above described modules. A heat exchanger 170 for engine coolant may be provided in tank 500 as a separate module or may be included in module 100. Pump unit 110' may be configured to generate the high flows needed when the RPM increases above a certain threshold. Optionally a bio-decontamination device 700, 700', such as a UV light decontamination device 700 of any one of the embodiments shown in FIGS. 7A, 8 and 8B, may be provided in the tank 500 and/or in the return line 360'.

The vehicle system of FIG. 14 comprises a first tank 500 for storing aqueous solution; a module 100 with a first pump unit 110; an injector 310 configured for injecting aqueous solution; a first portion 350a' of a feed line 350' connecting pump unit 110 to a second tank 500' and a second portion 350b' of a feed line 350' connecting second tank 500' to the injector 310; and a further pump unit 110' in the feed line portion 350b'. Pump unit 110' and/or pump unit 110 allow aqueous solution from the tank 500 to be pumped to the injector 310. A return line 360' is provided from second tank 500' back to the tank 500. This return line 360' comprises a check valve 160'. The module 100 may be embodied according to any one of the above described modules. A heat exchanger 170' for engine coolant may be provided in tank 500' as a separate module. Pump unit 110' may be configured to generate the high flows needed when the RPM increases above a certain threshold. Optionally a bio-decontamination device 700, 700', such as a UV light decontamination device 700 of any one of the embodiments shown in FIGS. 7A, 8 and 8B, may be provided in the tank 500 and/or in the return line 360' and/or in the tank 500' (not shown). Tank 500 may be located in the back of the car, and tank 500 and pump unit 110' may be located in the engine compartment.

Figure 15:
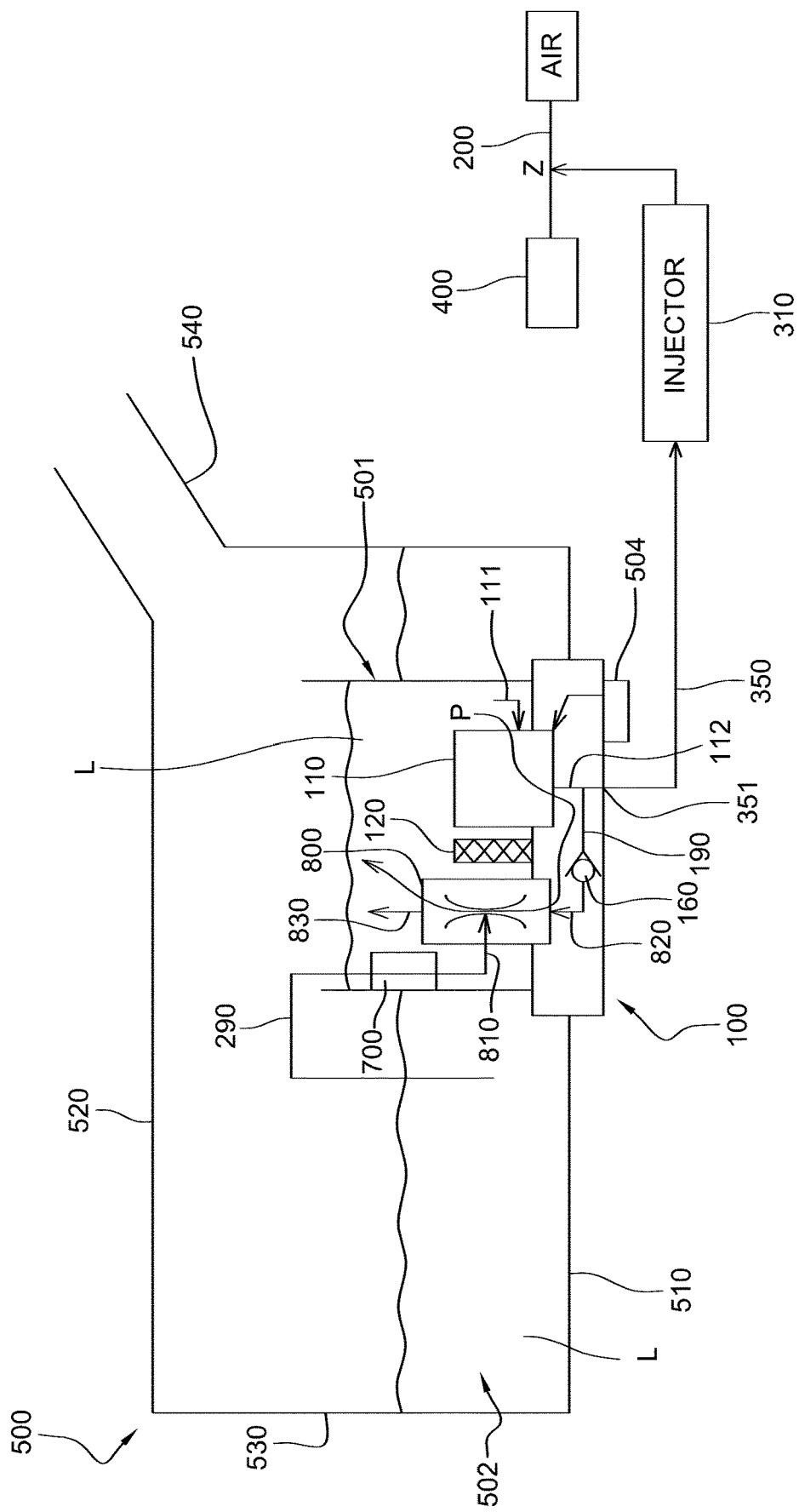
FIGS. 15 and 16 illustrate schematically further exemplary embodiments of vehicle systems comprising a jet pump and a UV light decontamination device integrated in a module mounted in an opening in the tank.

FIG. 15 illustrates a vehicle system storing an aqueous solution L. The vehicle system comprises a first compartment 501 for storing aqueous solution L, a second compartment 502 for storing an aqueous solution L, and a module 100. In this embodiment second compartment 502 is a tank 500, and first compartment 501 is a bowl integrated in module 100, such that the bowl is positioned in the tank 500. Module 100 is arranged in an opening in a wall of tank 500. Tank 500 is provided with a filler pipe 540 for filling tank 500, and hence also compartment 501, with aqueous solution L. Tank 500 has a bottom wall 510, a top wall 520 and a sidewall 530 connecting the bottom wall 510 with the top wall 520. An opening is arranged in bottom wall 510. In the mounted position of tank 500, bottom wall 510 corresponds with the lowest face of tank 500. Module 100 is mounted in the opening in bottom wall 510 of tank 500, e.g. by welding or by any other suitable connection means, e.g. using a ring-nut system screwed onto a thread on tank 500, or using a closure system of the bayonet type. In another non-illustrated embodiment the opening may be arranged in sidewall 530, in a lower half of the tank 500.

Module 100 comprises a feed pump unit 110, a jet pump 800, and a heater 120. Feed pump unit 110 is connected for pumping aqueous solution L from the first compartment 501 to a feed outlet 351. Feed outlet 351 is intended for being connected to a feed line 350 for injecting aqueous solution L by an injector 310, e.g. in an air intake line 200 upstream of a combustion chamber 400 of an internal combustion engine. Alternatively aqueous solution may be injected directly in combustion chamber 400 of the internal combustion engine. More generally, for the described application, the aqueous solution may be injected anywhere as long as the injection is such that the air injected in combustion chamber 400 is cooled. Feed line 350 extends between feed outlet 351 and injector 310, for feeding injector 310 with aqueous solution out of first compartment 501.

Jet pump 800 has a suction inlet 810, a pressure inlet 820 and an outlet 830. Pump unit 110 is further connected for pumping aqueous solution along a jet flow path P. The jet flow path P extends from an inlet 111 of feed pump unit 110 to an outlet 112 of feed pump unit 110 through a driving line 190 between outlet 112 and pressure inlet 820 of jet pump 800, to outlet 830 of jet pump 800. Suction inlet 810 is connected to a suction line 290 arranged for receiving aqueous solution from the second compartment 502. Outlet 830 of jet pump 800 is arranged for returning aqueous solution from suction inlet 810 and from pressure inlet 820 to first compartment 501. The vehicle system further comprises a controller 504 configured for controlling feed pump unit 110. Controller 504 may be configured to pump aqueous solution from second compartment 502 to first compartment 501 when the level of the aqueous solution in first compartment 100 is below a predetermined level. Controller 504 is shown mounted on module 100, but the skilled person understands that it may also be located remotely from module 100. Furthermore, a UV light decontamination device 700 is included in module 100 and is arranged to operate on fluid flowing through the suction line 290. In this way, the fluid being transferred by the jet pump 800 through the suction line 290 is decontaminated by the UV light decontamination device 700.

Figure 16:
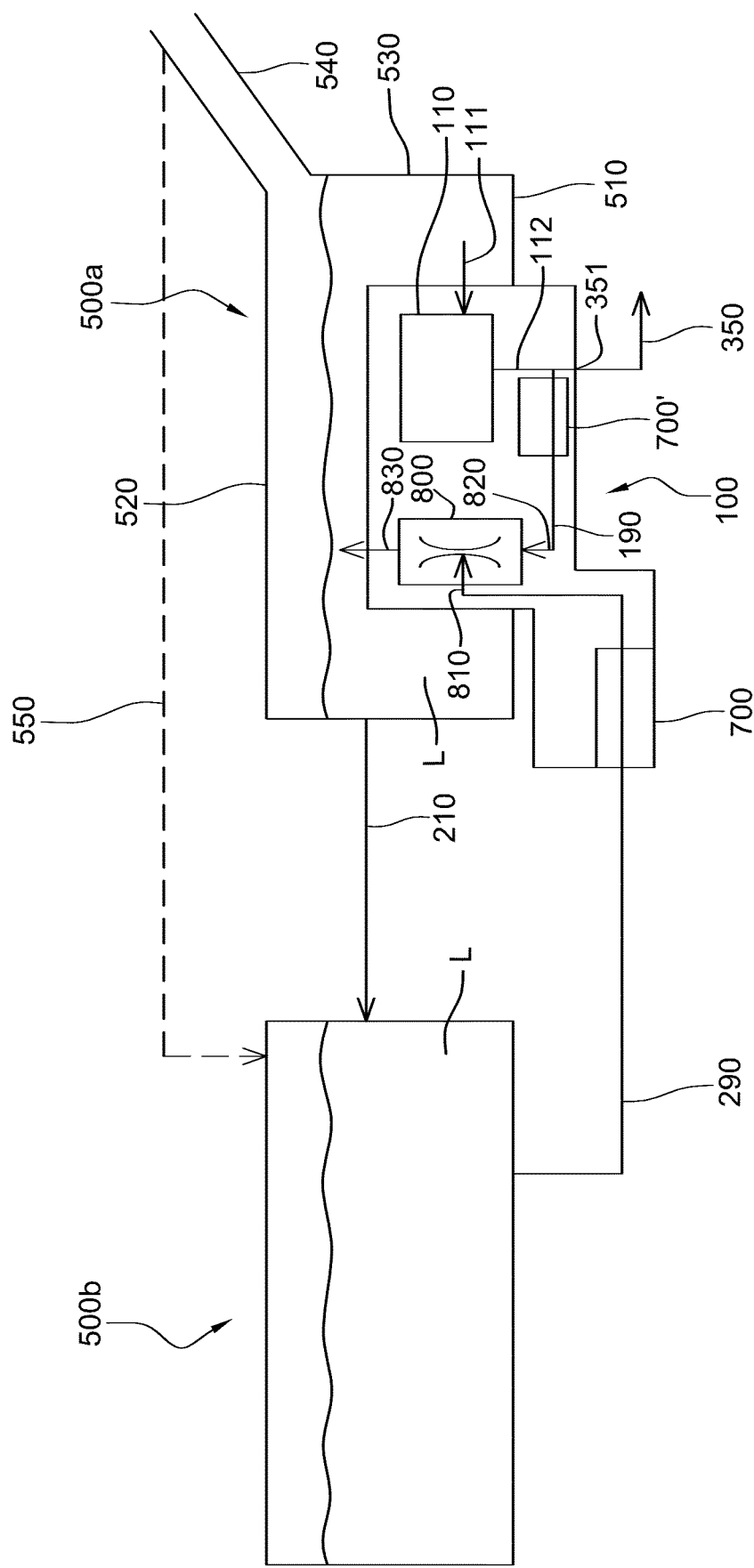

FIG. 16 illustrates another vehicle system storing an aqueous solution L. The vehicle system comprises a first tank 500a for storing aqueous solution L, a second tank 500b for storing an aqueous solution L, and a module 100. The module 100 is arranged in an opening in a wall of first tank 500a. First tank 500a is provided with a filler pipe 540 for filling first tank 500a, and via an overflow line 210, also second tank 500b, with aqueous solution L. First tank 500a has a bottom wall 510, a top wall 520 and a sidewall 530 connecting bottom wall 510 with top wall 520. An opening is arranged in bottom wall 510. In the mounted position of first tank 500a, bottom wall 510 corresponds with the lowest face of first tank 500a. Module 100 is mounted in the opening in bottom wall 510 of first tank 500a, e.g. by welding or by any other suitable connection means. In another non-illustrated embodiment the opening may be arranged in sidewall 530, in a lower half of the tank 500a.

Module 100 comprises a feed pump unit 110, a jet pump 800, and optionally also a heater 120 (not shown in FIG. 3). Feed pump unit 110 is connected for pumping aqueous solution L from the first tank 500a to a feed outlet 351 intended for being connected to a feed line 350 as in the embodiment of FIG. 1. Jet pump 800 has a suction inlet 810, a pressure inlet 820 and an outlet 830. Feed pump unit 110 is further connected for pumping aqueous solution along a jet flow path. The jet flow path extends from an inlet 111 of feed pump unit 110 to an outlet 112 of feed pump unit 110 through a driving line 190 between outlet 112 and pressure inlet 820 of jet pump 800, to outlet 830 of jet pump 800. Suction inlet 810 is connected to a suction line 290 arranged for receiving aqueous solution from second tank 500b. Outlet 830 of jet pump 800 is arranged for returning aqueous solution from suction inlet 810 and from pressure inlet 820 to first tank 500a. The vehicle system may further comprise a controller (not shown) configured for controlling feed pump unit 110. The controller may be configured to pump aqueous solution from second tank 500b to first tank 500a when the level of the aqueous solution in first tank 500a is below a predetermined level. Furthermore, a UV light decontamination device 700 is mounted on the module 100 and is arranged to operate on fluid flowing through the suction line 290. Alternatively or in addition, a UV light decontamination device 700' may be mounted on the module 100 and is arranged to operate on fluid flowing through the jet flow path at the driving line 190.

An optional heater (not shown) may be configured and arranged for heating at least said jet flow path. Further a check valve (not shown) may be included in the jet flow path in a similar manner as described above for FIG. 15.

First tank 500a may be positioned in a vehicle at a higher level than second tank 500b. In an alternative embodiment first tank 500a and second tank 500b may be positioned at more or less the same height and a filler line 550 may be provided between filler pipe 540 of first tank 500a and second tank 500b.

In alternative embodiments the UV light decontamination device 700 of FIG. 15 or 16 may be arranged at outlet 830 of jet pump 800 instead of in the suction line 290. Further, in the embodiment of FIG. 15, UV light decontamination device 700 may be arranged in the first compartment 501 such that it decontaminates aqueous solution in the first compartment, e.g. UV light decontamination device 700 may be arranged more or less centrally in the first compartment.

In alternative embodiments the jet pump 800 in the embodiment of FIG. 16 may be arranged outside of first tank 500a, e.g. in a second module mounted in a wall of second tank 500b. In such embodiments the drive line 190 goes from the first tank 500a to the jet pump 800 of the second module of the second tank 500b, and the outlet 830 is connected to a return line going back from the second tank 500b to the first tank 500a.

Whilst the principles of the invention have been set out above in connection with specific embodiments, it is to be understood that this description is merely made by way of example and not as a limitation of the scope of protection which is determined by the appended claims.

The invention claimed is:

1. A vehicle system for injecting an aqueous solution into an air intake upstream of a combustion chamber or directly into a combustion chamber, said vehicle system comprising:
a tank for storing an aqueous solution;
a pump unit;
an injection system configured for injecting aqueous solution from the tank in an injection zone in the vehicle; and
a UV light decontamination device configured for decontaminating the aqueous solution stored in the tank by emitting UV light,
wherein the UV light decontamination device is integrated in a module mounted in an opening of the tank,
wherein said vehicle system further comprises a return line connecting an outlet of the pump unit with the interior of the tank, and
wherein the UV light decontamination device is arranged in the return line.

2. The vehicle system of claim 1, wherein the UV light decontamination device is arranged in the tank.

3. The vehicle system of claim 1, Wherein the UV light decontamination device contains a fluid passage and is configured to emit UV light in said fluid passage, and
wherein the vehicle system is configured for transferring aqueous solution stored in the tank through said fluid passage.

4. The vehicle system of claim 3, wherein the fluid passage is arranged such that the pump unit can transfer aqueous solution through said fluid passage.

5. The vehicle system of claim 1, wherein the injection system comprises an injector and a feed line connecting the pump unit to the injector such that aqueous solution from the tank can be pumped to the injector.

6. The vehicle system of claim 1, wherein the pump unit is inter in the module.

7. The vehicle system of claim 1, wherein the return line is integrated in the module.

8. The vehicle system of claim 7, wherein the return line is connected to a feed line in the module.

9. The vehicle system of claim 7, wherein the return line comprises a valve, and wherein UV light decontamination device is arranged in the return line, downstream or upstream of the valve.

10. The vehicle system of claim 1, wherein the module further comprises any one or more of the following components: a heater, a level sensor, a quality sensor, a filter, a bowl defining a fluid compartment in the tank.

11. The vehicle system of claim 1, wherein the tank has a bottom wall, a top wall and a sidewall connecting the bottom wall with the top wall, wherein the opening is arranged in the bottom wall, wherein, in the mounted position of the tank, the bottom wall corresponds with the lowest face of the tank.

12. The vehicle system of claim 1, wherein the UV light decontamination device is configured to emit UV light from a central location in the tank to a sidewall of the tank, wherein optionally the sidewall is provided with a reflector.

13. The vehicle system of claim 1, wherein the pump unit is inside the tank.

14. The vehicle system of claim 1, further comprising a jet pump having a suction inlet, a pressure inlet and an outlet, said pump unit being connected for pumping aqueous solution along a jet flow path from the tank through the pump unit, through the pressure inlet of the jet pump to the outlet of the jet pump, said outlet being arranged for returning aqueous solution from the suction inlet and from the pressure inlet to the tank; wherein the UV light decontamination device is arranged to operate on fluid flowing in the jet flow path and/or to operate on fluid flowing to the suction inlet.

15. The vehicle system of claim 14, wherein said suction inlet is connected to a suction line arranged for receiving aqueous solution from one of: a compartment in the tank; a second tank for storing an amount of aqueous solution.

16. A vehicle system for injecting an aqueous solution into an air intake upstream of a combustion chamber or directly into a combustion chamber, said vehicle system comprising:
a tank for storing an aqueous solution;
an injection system configured for injecting aqueous solution from the tank in an injection zone in the vehicle; and
a UV light decontamination device configured for decontaminating the aqueous solution stored in the tank by emitting UV light;
wherein the UV light decontamination device contains a fluid passage and is configured to emit UV light in said fluid passage, and
wherein the vehicle system is configured fir transferring aqueous solution stored in the tank through said fluid passage;
wherein the fluid passage is located inside the tank.

17. The vehicle system of claim 16, further comprising a pump unit.

18. The vehicle system of claim 17, wherein the injection system comprises an injector and a feed line connecting the pump unit to the injector such that aqueous solution from the tank can be pumped to the injector.

19. The vehicle system of claim 17 wherein the fluid passage is arranged such that the pump unit can transfer aqueous solution through said fluid passage.

20. The vehicle system of claim 17, further comprising a return line connecting an outlet of the pump unit with the interior of the tank; wherein the UV light decontamination device is arranged in the return line.

21. The vehicle system of claim 20, wherein the return line is connected to a feed line in a module mounted in an opening of the tank.

22. The vehicle system of claim 20, wherein the return line is integrated in a module mounted in an opening of the tank.

23. The vehicle system of claim 17, wherein the pump unit is inside the tank.

24. The vehicle system of claim 16, wherein the UV light decontamination device is integrated in a module mounted in an opening of the tank.

25. The vehicle system of claim 24, herein a pump unit is integrated in the module.

26. The vehicle system of claim 24, wherein the module further comprises any one or more of the following components: a heater, a level sensor, a quality sensor, a filter, a bowl defining a fluid compartment in the tank.

27. The vehicle system of claim 24, wherein the tank has a bottom wall, a top wall and a sidewall connecting the bottom wall with the top wall, wherein the opening is arranged in the bottom wall, wherein, in the mounted position of the tank, the bottom wall corresponds with the lowest face of the tank.

* * * * *